United States Patent [19]
Alten et al.

[11] Patent Number: 5,148,751
[45] Date of Patent: Sep. 22, 1992

[54] BRIDGING MECHANISM FOR CROSSING RAILROAD TRACKS WITH VERTICALLY MOVING PIVOT CARRIAGE FOR BRIDGE PLATE

[75] Inventors: Kurt Alten, Ringstr. 14, D-3015 Wennigsen; Albert Böttcher, Wennigsen, both of Fed. Rep. of Germany

[73] Assignee: Kurt Alten, Wennigsen, Fed. Rep. of Germany

[21] Appl. No.: 778,003

[22] Filed: Oct. 17, 1991

[30] Foreign Application Priority Data

Oct. 17, 1990 [DE] Fed. Rep. of Germany ....... 4032892

[51] Int. Cl.⁵ .............................................. E01F 1/00
[52] U.S. Cl. ........................................ 104/31; 14/71.7
[58] Field of Search ............................ 104/29, 30, 31; 105/436; 14/71.7, 725

[56] References Cited

U.S. PATENT DOCUMENTS

| | | | |
|---|---|---|---|
| 3,004,272 | 10/1961 | Clarke | 104/31 X |
| 3,886,614 | 6/1975 | Rosengren | 14/71.7 |
| 3,892,088 | 7/1975 | Fleenor | 105/436 X |
| 4,308,697 | 1/1982 | Guppy | 104/31 X |
| 4,694,522 | 9/1987 | Alten | 14/71.7 |

FOREIGN PATENT DOCUMENTS 927390 5/1955 Fed. Rep. of Germany ........ 104/31

*Primary Examiner*—Robert J. Oberleitner
*Assistant Examiner*—Joseph Morano
*Attorney, Agent, or Firm*—Robert W. Becker & Associates

[57] ABSTRACT

A bridging mechanism, the bridge plate of which can be pivoted from a vertical rest position behind the tracks into a horizontal operating position in which the free end of the bridge plate rests upon a dock or platform. The pivot connection of the bridge plate is mounted on a vertical support structure of a travel mechanism that is disposed behind the tracks. To achieve a large span length of the bridging mechanism where low ceilings are present, the pivot connection of the bridge plate is mounted such that it can be raised and lowered on the support structure. When the bridge plate is swung up out of the working position and into the approximately vertical rest position, the pivot connection is lowered, and when the bridge plate is swung down from the approximately vertical rest position into the operating position, the pivot connection is lowered.

10 Claims, 2 Drawing Sheets

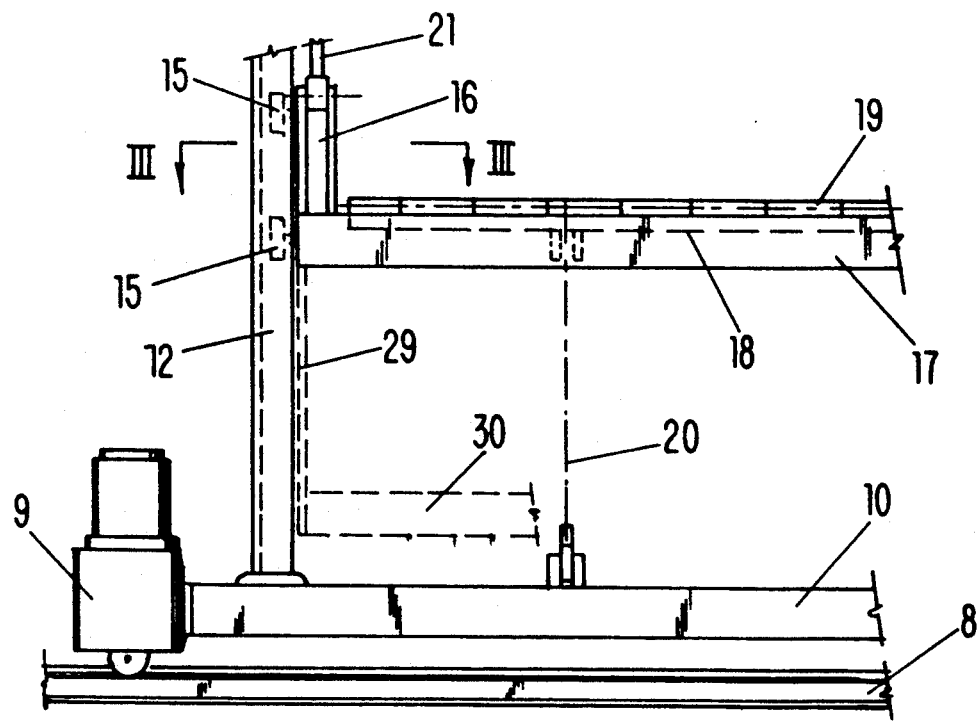
FIG-2
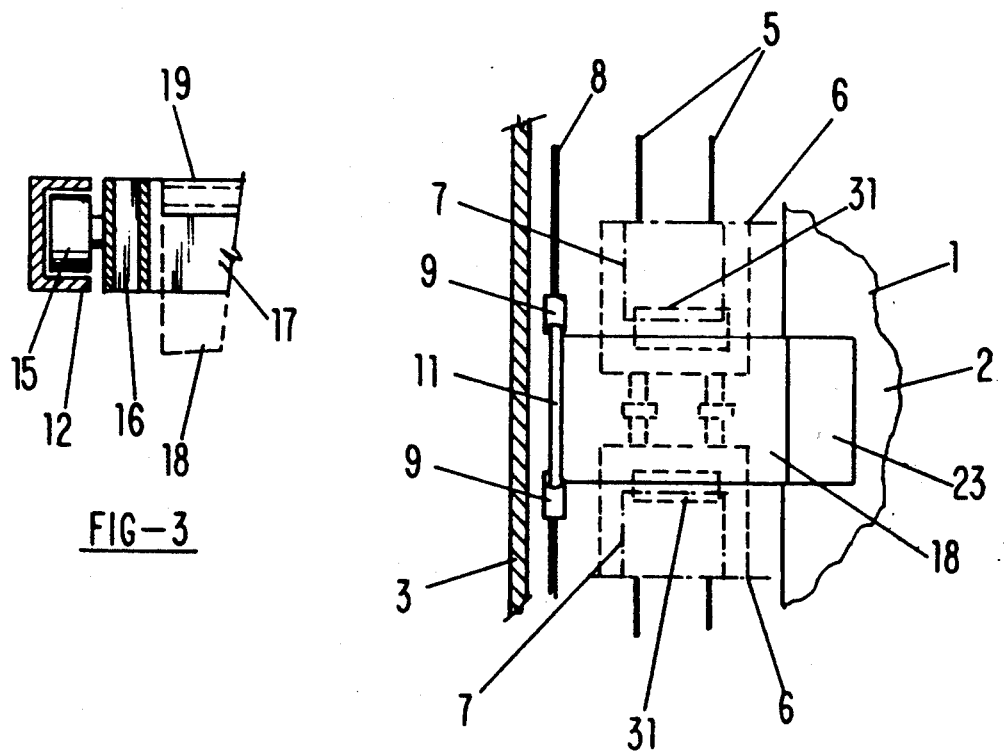
FIG-3
FIG-4

BRIDGING MECHANISM FOR CROSSING RAILROAD TRACKS WITH VERTICALLY MOVING PIVOT CARRIAGE FOR BRIDGE PLATE

BACKGROUND OF THE INVENTION

The present invention relates to a bridging mechanism for crossing railroad tracks, and includes a bridge plate that, by means of a pivot connection means having a horizontal pivot axis and being disposed behind the tracks, can be pivoted from an approximately vertical and upright rest position into an approximately horizontal work position in which the free end of the bridge plate rests upon a dock or platform that is disposed in front of the tracks, with the pivot connection means being disposed on a vertically upwardly directed support structure of a travel mechanism that is disposed behind the tracks and is guided parallel thereto.

Known bridging mechanisms require a considerable amount of free space and a relatively high ceiling above the tracks in order to be able to swing the bridge plate up so that in a rest position it is directed vertically upwardly.

It is therefore an object of the present invention to embody a bridging mechanism of the aforementioned general type in such a way that even in a building having a relatively low ceiling, the bridge plate can have a large span length

BRIEF DESCRIPTION OF THE DRAWINGS

This object, and other objects and advantages of the present invention, will appear more clearly from the following specification in conjunction with the accompanying schematic drawing, in which:

FIG. 2 is a partial view of the bridging mechanism of FIG. 1 taken in the direction of the arrow II;

FIG. 3 is a cross-sectional view taken along the line III—III in FIG. 2; and

FIG. 4 is a plan view of an overall layout utilizing the bridging mechanism of FIGS. 1-3.

SUMMARY OF THE INVENTION

Figure 1:
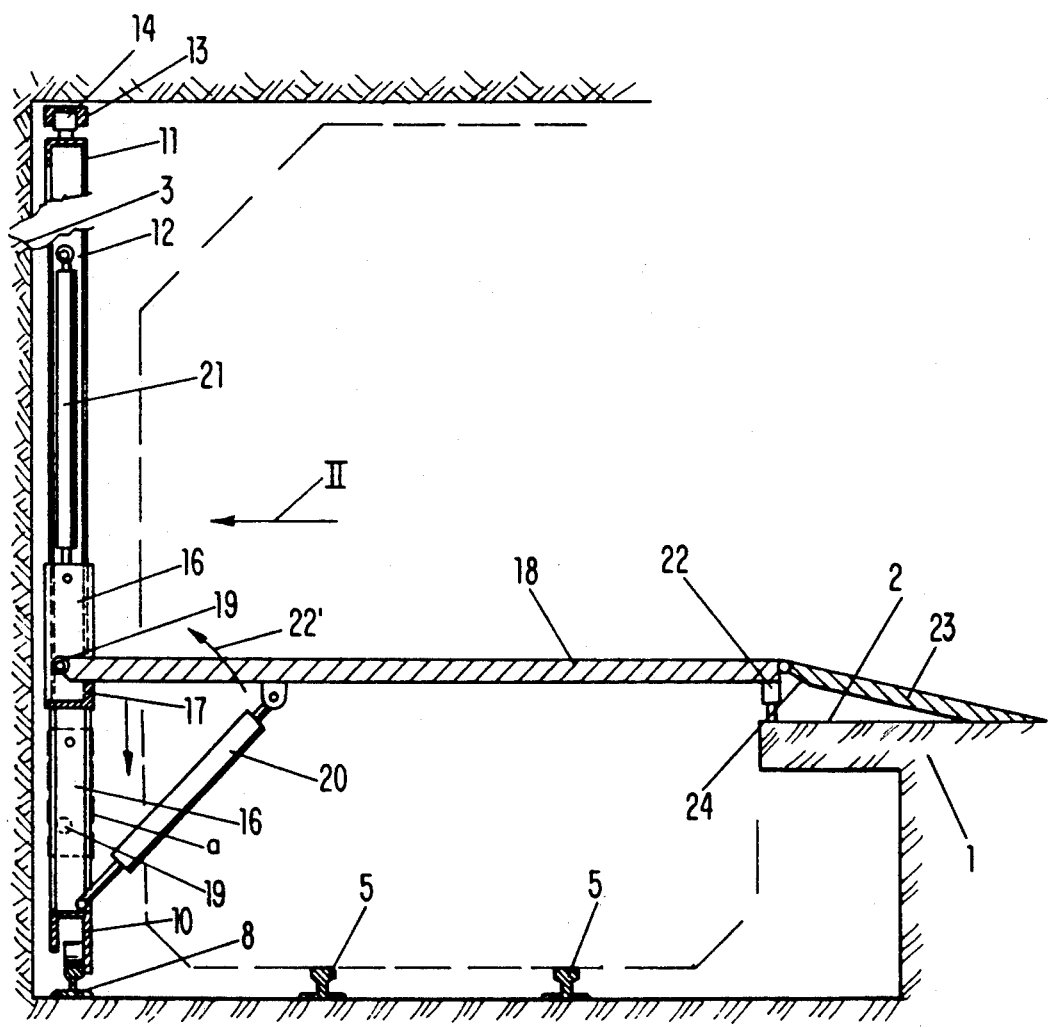
FIG. 1 is a vertical cross-sectional view of one exemplary embodiment of the inventive bridging mechanism for crossing railroad tracks in the operating position, with the bridge plate being cross-sectioned along its length.

The bridging mechanism of the present invention is characterized primarily in that the pivot connection means of the bridge plate is mounted on the support structure in such a way that it can be raised and lowered, with the arrangement being such that the raising and lowering is carried out during pivoting of the bridge plate. In particular, pursuant to the present invention the pivot connection means, and hence the bridge plate, are lowered during pivoting of the bridge plate from the approximately horizontal work position into the approximately vertical rest position, while the pivot connection means and hence the bridge plate are again raised when the bridge plate is to be pivoted back into the operating position.

As a consequence of the inventive proposal, the overall height of the bridging mechanism is in effect reduced by the aforementioned displacement of the pivot connection means. Thus, the inventive bridging mechanism can be installed in areas having lower ceilings.

The present invention can be implemented particularly advantageously if, at a distance from the pivot connection means, the bridge plate is supported by one or more connecting rods, swivel supports, or similar guide means, the upper end of which is attached to the bridge plate and the lower end of which is attached to the support structure. In addition, the pivot connection means is advantageously mounted on a carriage means that is movable on the support structure and in the direction thereof. Thus, in order to swing the bridge plate up, it is merely necessary to move the carriage means downwardly, for example via a working cylinder; in so doing, the pivot connection means is lowered, while at the same time the bridge plate is pivoted about the upper connection on the connecting rod or the swivel support, which in turn executes a pivoting movement in the direction toward the support structure. In the drawn-in, pivoted up state of the bridge plate, the swivel support is then disposed approximately in the plane of the support structure, while the pivot connection means has approached the lower end of the support structure.

Further specific features of the present invention will described in detail subsequently.

DESCRIPTION OF PREFERRED EMBODIMENTS

Referring now to the drawing in detail, tracks 5 are disposed between a dock or platform 1, which has a surface 2, and the outer wall 3 of a building, the ceiling of which is designated by the reference numeral 4. The coupled-together railroad cars 6 are loaded with containers 7, which must be loaded and unloaded from the ends. Disposed between the outer wall 3 and the adjacent track 5 is a rail 8 that extends parallel to the tracks 5 and serves for an electrically operated travel mechanism 9. This travel mechanism carries a vertically upwardly extending support structure that is in the form of a closed frame having a lower crossbar 10, an upper crossbar 11, and two side supports 12 that are in the form of iron members that have a U-shaped cross section. Disposed below the ceiling 4 and extending parallel to and above the rail 8 is a guide rail 13 that is engaged by guide rollers 14 of the upper crossbar 11 so as to support the frame in such a way that it will be stable and cannot tilt.

By means of rollers 15, carriage means 16 are mounted on the two supports 12 in such a way that they are longitudinally displaceable. The carriage means 16 are rigidly interconnected via a cross member 17 that is provided with a pivot connection in the form of hinge means 19 for a bridge plate 18 so that the latter can pivot about a horizontal axis.

At approximately one fourth of its length the bridge plate 18 is supported from below by, for example, two swivel supports 20 that are hinged at the bottom to the crossbar 10. In addition, attached to the carriage means 16 is a working cylinder 21 that extends parallel to the support 12 and at the top is secured thereto; this working cylinder can effect a displacement of the carriage means.

In the approximately horizontal operating position of the bridge plate 18 illustrated in FIG. 1, the free end of the bridge plate 18 is supported on the platform 1 via a hydraulic support member 22, the length of which can be varied, with the length of the support member 22 being fixed by a hydraulic fluid stop means with respect to reversal of this support member.

If the bridge plate 18 is to be moved into its rest position by being swung up, the working cylinder 21 is actuated to move the two carriage means 16 downwardly. In so doing, the bridge plate 18 carries out a pivoting movement about the upper pivot connection of the swivel supports 20, which as the carriage means 16 continue to move downwardly themselves pivot in the direction of the arrow 22' in a direction toward the supports 12. In the end position, the carriage means 16 have assumed the position indicated by dashed lines and the reference symbol "a" (FIG. 1), while the two swivel supports or cylinders 20 extend parallel to the supports 12. The two swivel supports 20 should provide an adequate pressure resistance. However, it is important that as the bridge plate 18 is swung up, the pivot connection thereof is lowered, so that the bridge plate can be accommodated in the rest position in a space-saving or recessed manner.

It should be noted that a ramp means 23, which is pivotably connected to the free end of the bridge plate 18, rests loosely upon the surface 2. As the bridge plate 18 is swung up, the ramp means 23 is taken along; the ramp means pivots downwardly, and in the end position assumes a position in which it forms an angle of approximately 90° with the bridge plate 18. A further pivoting of the ramp means 23 is prevented because the surface 24 of the ramp means abuts against the end face of the bridge plate 18. During lowering, the tip of the ramp means 23 comes to rest against the surface 2, and in the end position assumes the position illustrated in FIG. 1.

The two cylinder means 20, 21 are expediently embodied as double-acting hydraulic cylinders, and are associated with a hydraulic system. This has the advantage that in cooperation with the support member 22, a control of the height of the bridge plate 18 can be carried out in order to be able to adapt the bridge plate to the desired height, and in particular to the height of the railroad cars 6. By means of the cylinder 20 21, it is possible to slightly extend one cylinder while the other cylinder is correspondingly shortened, and in particular to the extent desired to make corrections in height.

In place of the height control described above with the aid of the two cooperating cylinders 20, 21, it would also be possible to provide a further carriage (indicated by the reference numeral 29 in FIG. 2) that would be provided for both of the supports 12. At the lower end, the two carriages are connected by a cross member 30, which serves for the pivotable connection of the swivel support 20. These further carriages also serve for the mounting of the carriage means 16 and thereabove, at the upper end, for the pivotable connection of the working cylinders 21. The thus provided larger carriage must then be capable of being adjusted in height by a separate operating cylinder in the sense of the hydraulic support member 22.

As shown in FIG. 4, further ramp means 31 can be provided in order to make the containers 7 more accessible from the bridge plate 18.

The present invention is, of course, in no way restricted to the specific disclosure of the specification and drawing, but also encompasses any modifications within the scope of the appended claims.

What we claim is:

1. A bridging mechanism for crossing railroad tracks, comprising:
   a travel mechanism that is disposed on one side of said tracks, is guided parallel thereto, and includes a vertically upwardly directed support structure on which is displaceably guided a pivot connection means having a horizontal pivot axis;
   a bridge plate having a rear end that is connected to said pivot connection means so as to be pivotable between an approximately vertical rest position and an approximately horizontal operating position in which a front end of said bridge plate rests upon a dock or platform that is disposed on an opposite side of said tracks; and
   means for raising and lowering said pivot connection means on said support structure to simultaneously effect pivoting of said bridge plate such that during raising of said bridge plate from said operating position into said rest position thereof said pivot connection means is lowered, and during lowering of said bridge plate from said rest position into said operating position thereof said pivot connection means is raised.

2. A bridging mechanism according to claim 1, in which said means for raising and lowering said pivot connection means on said support structure includes: guide means supporting said bridge plate at a distance from said pivot connection means; carriage means disposed on said support structure so as to be displaceable upwardly and downwardly, with said pivot connection means being mounted on said carriage means; and a working cylinder that acts upon said carriage means.

3. A bridging mechanism according to claim 2, in which an end of said guide means remote from said bridge plate is connected to said support structure.

4. A bridging mechanism according to claim 2, in which an end of said guide means remote from said bridge plate is connected to said carriage means.

5. A bridging mechanism according to claim 2, in which said carriage means comprises two carriages interconnected by a cross member, with an end of said guide means remote from said bridge plate being connected to said cross member.

6. A bridging mechanism according to claim 2, in which said guide means is a double-acting hydraulic cylinder, and said working cylinder is disposed above said carriage means and is also a double-acting cylinder.

7. A bridging mechanism according to claim 6, in which said cylinder of said guide means and said working cylinder cooperate via a hydraulic system such that an extension of one of said cylinders allows retraction of the other of said cylinders.

8. A bridging mechanism according to claim 7, in which actuation of said two cylinders permits regulation of the height of said bridge plate in said operating position thereof.

9. A bridging mechanism according to claim 2, in which in said rest position of said bridge plate, both said guide means as well as said working cylinder are practically vertically disposed.

10. A bridging mechanism according to claim 2, in which both said guide means and said working cylinder are respectively provided in pairs, with the members of each pair being disposed on opposite sides of said bridge plate.

* * * * *